United States Patent
Khan et al.

(10) Patent No.: US 9,765,840 B2
(45) Date of Patent: Sep. 19, 2017

(54) DAMPING BEARING

(71) Applicant: TRENCH LIMITED, Scarborough (CA)

(72) Inventors: Kamran Khan, Toronto (CA); Helmut Reisinger, Schwertberg (AT)

(73) Assignee: SIEMENS AKTIENGESELLSCHAFT, München (DE)

( * ) Notice: Subject to any disclaimer, the term of this patent is extended or adjusted under 35 U.S.C. 154(b) by 88 days.

(21) Appl. No.: 14/409,255

(22) PCT Filed: Jul. 9, 2013

(86) PCT No.: PCT/CA2013/050530
§ 371 (c)(1),
(2) Date: Dec. 18, 2014

(87) PCT Pub. No.: WO2014/008597
PCT Pub. Date: Jan. 16, 2014

(65) Prior Publication Data
US 2015/0176674 A1 Jun. 25, 2015

Related U.S. Application Data

(60) Provisional application No. 61/669,304, filed on Jul. 9, 2012.

(51) Int. Cl.
F16C 11/06 (2006.01)
F16C 23/04 (2006.01)
F16M 11/06 (2006.01)
F16F 9/32 (2006.01)
F16M 7/00 (2006.01)
F16C 27/02 (2006.01)

(52) U.S. Cl.
CPC .......... *F16F 9/3207* (2013.01); *F16C 11/068* (2013.01); *F16C 23/043* (2013.01);
(Continued)

(58) Field of Classification Search
CPC ............. B60G 2204/416; F16C 11/068; F16C 11/106; F16C 23/043; F16C 27/045;
(Continued)

(56) References Cited

U.S. PATENT DOCUMENTS 2,544,584 A * 3/1951 Booth ................. F16C 11/0609
403/127
4,154,544 A * 5/1979 Gair ....................... B60G 7/005
403/131
(Continued)

FOREIGN PATENT DOCUMENTS

DE 2314310 A1 * 11/1973
WO 2014008597 A1 1/2014

OTHER PUBLICATIONS

"Grease fitting." Wikipedia.com. [online], [retrieved on Jul. 2, 2017]. Retrieved from the Internet <URL: https://en.wikipedia.org/wiki/Grease_fitting>.*
(Continued)

*Primary Examiner* — Josh Skroupa

(57) ABSTRACT

A damping bearing (20) including an inner ball portion (34) attached to an end of a support shaft (32), and an outer collar portion (30) attached to a housing (22) for rotation of the housing relative to the support shaft about a center point. A chamber (28) for a damping fluid such as grease is defined by clearance between the end of the shaft and the housing. The fluid chamber has opposed bounding surfaces (29, 37) that are non-spherical about the center of rotation so that the chamber changes shape upon rotation of the bearing, thus shifting damping fluid across the chamber. The chamber may be a flat cylindrical void normal to a centerline (33) of the shaft. It may provide only enough clearance for less than ±10 of relative rotation between the housing and shaft. A set-screw (26) may pressurize the fluid in the chamber.

8 Claims, 2 Drawing Sheets

(52) U.S. Cl.
CPC ............... *F16C 27/02* (2013.01); *F16M 7/00* (2013.01); *F16M 11/06* (2013.01); *Y10T 403/32614* (2015.01); *Y10T 403/32704* (2015.01); *Y10T 403/32729* (2015.01)

(58) Field of Classification Search
CPC ......... F16F 9/3207; F16M 7/00; F16M 11/06; Y10T 403/32032; Y10T 403/32196; Y10T 403/32311; Y10T 403/32631; Y10T 403/32639; Y10T 403/32704; Y10T 403/32729
USPC ....... 403/40, 56, 76, 90, 120, 122, 123, 131, 403/134
See application file for complete search history.

(56) References Cited

U.S. PATENT DOCUMENTS

| | | | | |
|---|---|---|---|---|
| 5,358,342 A | * | 10/1994 | Frisbee | E02F 3/80 172/827 |
| 5,816,731 A | * | 10/1998 | Howard | B62D 7/16 403/120 |
| 7,600,940 B1 | * | 10/2009 | Byrnes | F16C 11/0623 403/131 |
| 7,670,078 B2 | * | 3/2010 | Elterman | F16C 11/0671 277/635 |
| 8,714,862 B2 | * | 5/2014 | Mevorach | F16C 11/0642 403/125 |
| 2008/0136072 A1 | | 6/2008 | Kolb et al. | |
| 2015/0176674 A1 | | 6/2015 | Khan et al. | |

OTHER PUBLICATIONS

"What is a practical application of Boyle's law?." Reference.com. [online], [retrieved on Jul. 2, 2017]. Retrieved from the Internet <https://www.reference.com/science/practical-application-boyle-s-law-56130761b5f47c6a#>.*

"Zerk fittings." Grainger. [online], [retrieved on Jul. 2, 2017]. Retrieved from the Internet <URL: http://www.grainger.com/category/ecatalog/N-1z0do6q>.*

* cited by examiner

DAMPING BEARING

CROSS REFERENCE TO RELATED APPLICATIONS

This application is the US National Stage of International Application No. PCT/CA2013/050530 filed Jul. 9, 2013 and claims benefit thereof, the entire content of which is hereby incorporated herein by reference. This application claims benefit of the 9 Jul. 2012 filing date of U.S. provisional patent application No. 61/669,304.

FIELD OF THE INVENTION

The invention relates to bearings that damp motion between a shaft and a housing, and particularly to bearings that damp oscillations of an object supported on legs or columns.

BACKGROUND OF THE INVENTION

An expression of the ability of a structure to dissipate kinetic energy when subjected to harmonic motion is termed "damping". Most structures have an inherent ability to damp. It is an engineering practice to associate a level of damping with a particular form, material, construction method, or level of stress of a structure. If a structure can be shown to dissipate more kinetic energy than would normally be attributed to that type of structure, then there may be a reduction in loading for certain types of forces. This, in turn, allows a reduction in the strength requirement of the structure, and thus a cost saving.

An electric power line reactor is an electrical component including one or more inductor elements wired between a power source and an electrical load. The reactor opposes rapid changes in current, thus, it attenuates spikes of current and limits peak currents. Reactors generate lateral accelerations that must be accommodated by their support structure. They need separation from the ground by electrical insulators and distance, resulting in elongated support legs with some lateral flexibility. They are therefore subject to oscillations. Current damping devices for such support structures are expensive and large, requiring extra real estate below the reactor.

BRIEF DESCRIPTION OF THE DRAWINGS

The invention is explained in the following description in view of the drawings that show.

DETAILED DESCRIPTION OF THE INVENTION

Figure 1:
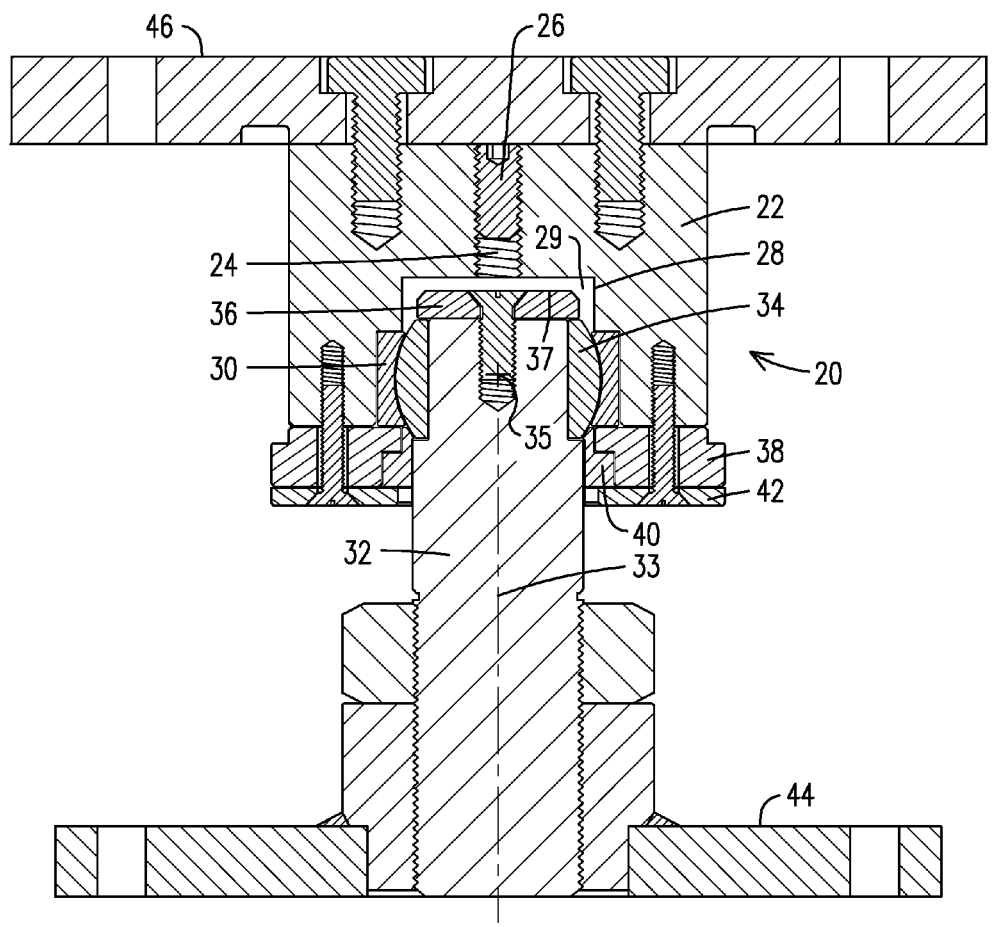
FIG. 1 is a side sectional view of a damping bearing assembly according to aspects of an embodiment of the invention.

FIG. 1 is a side sectional view of a damping bearing assembly 20 according to aspects of an embodiment of the invention. A bearing housing 22 may have a threaded bore 24 leading to a damping fluid chamber 28 defined by clearance between an end of a support shaft 32 and the housing 22. A fluid sealing set screw 26 in the bore may provide access to the chamber 28, and may further provide a fluid pressure adjustment to a damping fluid 29 therein. Herein "damping fluid" includes viscous fluids, semi-fluids, gels, and especially greases. The fluid used in tests of the invention described herein is an aluminum complex automotive/machine grease called Permalube™ Red, which has a National Lubricating Grease Institute (NLGI) consistency number of 2. The consistency of the damping fluid 29 may be selected in combination with designing the shape and size of the damping fluid chamber 28 to cause a desired damping effect. The damping fluid chamber 28 is a void defined between inner surfaces of the housing and elements on the end of the shaft.

A spherical bearing on the end of the shaft 32 has an inner ball portion 34 surrounded by a mating outer collar portion 30, the two portions having a common center of rotation 35 relative to each other. The inner surface of the outer collar portion 30 may closely fit around and against an annular portion of the inner ball portion 34. The inner and outer portions of the bearing may be formed as respective rings with respective outer and inner mating spherical surfaces with a common geometric center 35. The inner ball portion 34 of the damping bearing may be mounted on a diametrically reduced portion of the shaft 32, and retained thereon by a shaft cap 36. The ball 34 and collar 30 portions of the bearing may be made of a hard material such as chrome steel for example to support the weight and tolerate the oscillations of a supported structure. The pressure of the damping fluid 29 can contribute to supporting the weight of the supported structure, thereby reducing the load on the bearing surfaces somewhat. The set-screw 26 may be torqued to adjust fluid pressure for this purpose and/or to modify its damping properties. A second locking set-screw (not shown) may be provided. The bearing outer collar portion 30 may be retained in the housing 22 by a bearing retainer plate 38. A flexible dust seal 40 may be retained on the shaft by a dust seal retention plate 42. A lower mounting plate 44 may be attached to the shaft 32, and an upper mounting plate 46 may be attached to the housing 22 for mounting the damping bearing assembly 20 in a supporting structure.

The damping fluid chamber 28 changes shape upon relative rotation between the housing and shaft, causing the damping fluid 29 to shift in the chamber. This characteristic is provided by at least first and second opposed bounding surfaces 29, 37 of the chamber that are not spherical surfaces centered on the bearing center of rotation 35. The first bounding surface 29 may be a planar inner surface in the housing and the second bounding surface 37 may be an outer surface on the end of the shaft parallel to the first bounding surface. These surfaces 29, 37 may be normal to the shaft centerline 33, and may define a flat cylindrical portion of the damping fluid chamber, where "flat" means having a height of less than ¼ the diameter of the cylindrical void. The chamber may for example have a volumetric shape of rotation about the shaft centerline 33. In such geometry, damping is maximal for bearing rotations about axes perpendicular to the shaft centerline 33, and is minimal for rotations about the shaft centerline. The chamber may have a cup shape over and around the end of the shaft, which end may be defined by the shaft cap 36.

Clearance between the opposed bounding surfaces 29, 37 may be at least sufficient to accommodate a predetermined bearing rotation range with a safety margin. For example, a rotation range of ±4 degrees may be accommodated by clearance between the opposed surface 29, 37, and between other parts, that allows rotation of at least ±4 degrees without interference, or it may allow ±5 or 6 degrees or more for safety. Minimizing the clearance between the opposed surfaces 29, 37 can increase damping, depending on type of damping fluid 29, so clearance provided by the damping chamber 28 may be limited, for example, to less than ±10 degrees of relative rotation.

The clearance between opposed surfaces 29, 37 bounding the damping fluid chamber may be designed based on the diameter of the chamber, the viscosity of the damping fluid 29, the number of damping bearings, the weight of the supported structure, and the resonant frequencies of the structure being damped in order to maximize damping effectiveness in general and/or to maximize damping at a particular frequency.

Figure 2:
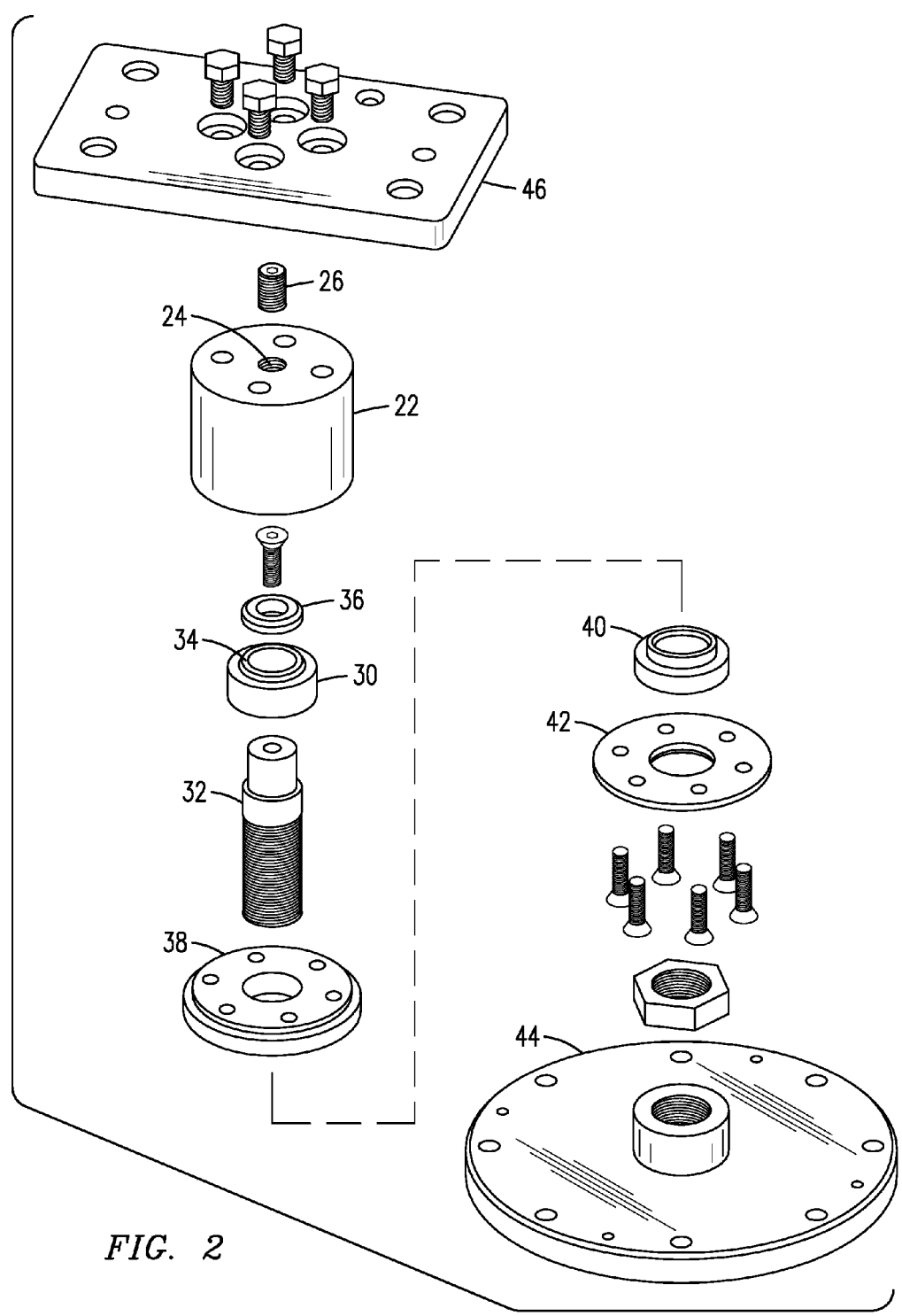
FIG. 2 is an exploded view of the assembly of FIG. 1.

FIG. 2 is an exploded view of the assembly of FIG. 1. The bearing ball 34 and collar 30 may be purchased as a pre-assembled unit as shown.

Figure 3:
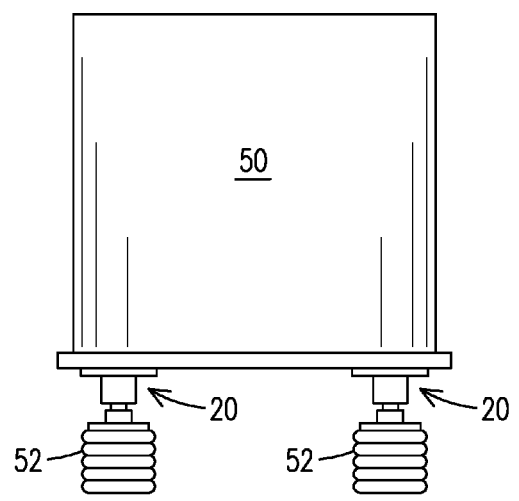
FIG. 3 illustrates a plurality of damping bearing assemblies supporting a structure such as an air core reactor coil.

FIG. 3 illustrates an application of the present invention to support a structure 50 on multiple legs or columns 52. The supported structure may be anything that benefits from damping, especially anything with self-induced lateral accelerations, such as combustion engines and electrical coils, capacitors, and motors. Any structure that experiences harmonic oscillations under self-induced or external accelerations may benefit, such as water towers and wind turbines. Tests were performed in which the supported structure 50 was an air-core reactor coil for electric power, and the columns 52 were provided with porcelain insulators per installation requirements. The tests showed a doubling of the damping ratio using the present damping bearings compared to control tests without damping bearings. The tests were performed as follows:

1. Install a reactor coil 50 on a support structure 20, 52 as in FIG. 3.
2. Use a hydraulic piston attached to an adjacent building structure to pull the coil laterally with a force of 4500 lbs.
3. Release the system, and capture the structural oscillations with a laser sensor.
4. Plot the captured oscillations with MathCAD/Excel to obtain the magnitudes of successive peaks of the oscillation.
5. The damping calculation method is Logarithmic Decrement.
6. Repeat the test five times.

Linearity and Precision: The linearity is 0.1% of Full Scale (Full Scale=250 mm). The precision of the sensor is 3 decimal places. Ambient temperature during test is 24 degrees Celsius.

Results without Damping Bearings

| Test # | Damping Ratio | Frequency |
|---|---|---|
| A1 | 2.97% | 0.855 Hz |
| A2 | 2.70% | 0.854 Hz |
| A3 | 2.79% | 0.854 Hz |
| A4 | 3.15% | 0.854 Hz |
| A5 | 3.21% | 0.854 Hz |

Results with Damping Bearings

| Test # | Damping Ratio | Frequency |
|---|---|---|
| B1 | 6.24% | 0.793 Hz |
| B2 | 6.25% | 0.793 Hz |
| B3 | 6.11% | 0.793 Hz |
| B4 | 6.28% | 0.793 Hz |
| B5 | 6.49% | 0.793 Hz |

The present damping bearing does not require an orifice for fluid friction as in automotive hydraulic shock absorbers. Thus, only one fluid chamber is needed. No chamber partitions, valves, springs, or pistons are needed. The lack of a fluid friction orifice reduces the possibility of cavitation in the damping fluid 29. The damping fluid 29 can be more viscous than the liquid hydraulic oils used in automotive shock absorbers. This reduces leakage. The inventors have found that the Permalube™ Red used in the present invention does not leak through or around the bearing ball and collar, even when fluid pressure is increased by the set-screw 26. The bearing ball 34 and collar 30 do not need to be custom made for the invention if a pre-assembled ball/collar bearing is available off-the-shelf in a desired size and shape. The present damping bearing damps rotary motions, which piston type shock absorbers do not. The relatively small size of the chamber 28 allows a high range of pressure adjustment by a simple set-screw 26, which can thus easily adjust for different weights of supported structures, reducing wear on the ball/collar bearing. The present damping bearing is small and compact compared to prior art damping devices such as hydraulic piston dampers.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A damping bearing comprising:
   a shaft;
   a ball portion on an end of the shaft;
   a collar portion encircling the ball portion and retained thereon for rotation relative to the ball portion about a bearing center point,
   wherein the collar portion fits around and against an annular portion of the ball portion, and
   wherein the ball portion and the collar portion are formed as respective rings with respective outer and inner mating spherical surfaces substantially overlapping and having a common geometric center;
   a housing fixed to the collar portion;
   a damping fluid chamber defined by a void between the end of the shaft and the housing, wherein the fluid chamber changes shape upon a rotation of the housing relative to the shaft, wherein the end of the shaft comprises a shaft cap that retains the ball portion on a diametrically reduced portion of the shaft;
   a threaded access bore between the damping fluid chamber and an outer surface of the housing;
   a set-screw threaded in the access bore that seals a damping fluid in the damping fluid chamber to provide a fluid pressure adjustment to the damping fluid in the damping fluid chamber;
   a lower mounting plate coupled to the shaft, the lower mounting plate configured for mounting an insulator; and
   an upper mounting plate coupled to the housing, the upper mounting plate configured for mounting a coil of an air core reactor, wherein the set-screw is configured to be buried under the upper mounting plate and the fluid pressure adjustment provided by the set-screw corresponds to different weights of a supported structure.

2. The damping bearing of claim 1, wherein the damping fluid chamber comprises a first bounding surface on the housing and an opposed second bounding surface on the end of the shaft, wherein the first and second bounding surfaces comprise planar surfaces that are parallel in one position of rotation of the housing relative to the shaft.

3. The damping bearing of claim 1, wherein the damping fluid chamber comprises a cup shaped void over and around the shaft cap.

4. The damping bearing of claim 1, wherein the damping fluid chamber provides only enough clearance for less than ±10 degrees of relative rotation between the shaft and the housing about the bearing center point.

5. A damping bearing comprising:
   a support shaft;
   an inner ball portion attached to an end of the support shaft;
   an outer collar portion fitted around the ball portion,
   wherein the outer collar portion fits around and against an annular portion of the inner ball portion, and
   wherein the inner ball portion and the outer collar portion are formed as respective rings with respective outer and inner mating spherical surfaces substantially overlapping and having a common geometric center;
   a housing attached to the collar portion for rotation of the housing relative to the support shaft about a bearing center point;
   a damping fluid chamber defined by a clearance between an end of the support shaft and the housing,
   wherein the damping fluid chamber comprises first and second opposed bounding surfaces that are not spherical surfaces of rotation about the bearing center point, and
   wherein a rotation of the housing about the bearing center point changes a shape of the damping fluid chamber,
   wherein the first bounding surface comprises a planar inner surface in the housing normal to a centerline of the support shaft and the second bounding surface comprises an outer planar surface on the end of the support shaft;
   a threaded access bore between the damping fluid chamber and an outer surface of the housing;
   a set-screw threaded in the access bore that seals a damping fluid in the damping fluid chamber to provide a fluid pressure adjustment to the damping fluid in the damping fluid chamber;
   a lower mounting plate coupled to the shaft, the lower mounting plate configured for mounting an insulator; and
   an upper mounting plate coupled to the housing, the upper mounting plate configured for mounting a coil of an air core reactor, wherein the set-screw is configured to be buried under the upper mounting plate and the fluid pressure adjustment provided by the set-screw corresponds to different weights of a supported structure.

6. The damping bearing of claim 5, wherein the end of the support shaft comprises a shaft cap that retains the ball portion on a diametrically reduced portion of the shaft.

7. The damping bearing of claim 6, wherein the damping fluid chamber comprises a cup-shaped void over and around the shaft cap.

8. The damping bearing of claim 5, wherein the set-screw is rotatably positionable to pressurize the damping fluid in the damping fluid chamber.

* * * * *